Oct. 14, 1952     D. J. CLARKE     2,613,911
FLUID TURNING-BLADE
Filed Nov. 6, 1947     2 SHEETS—SHEET 1
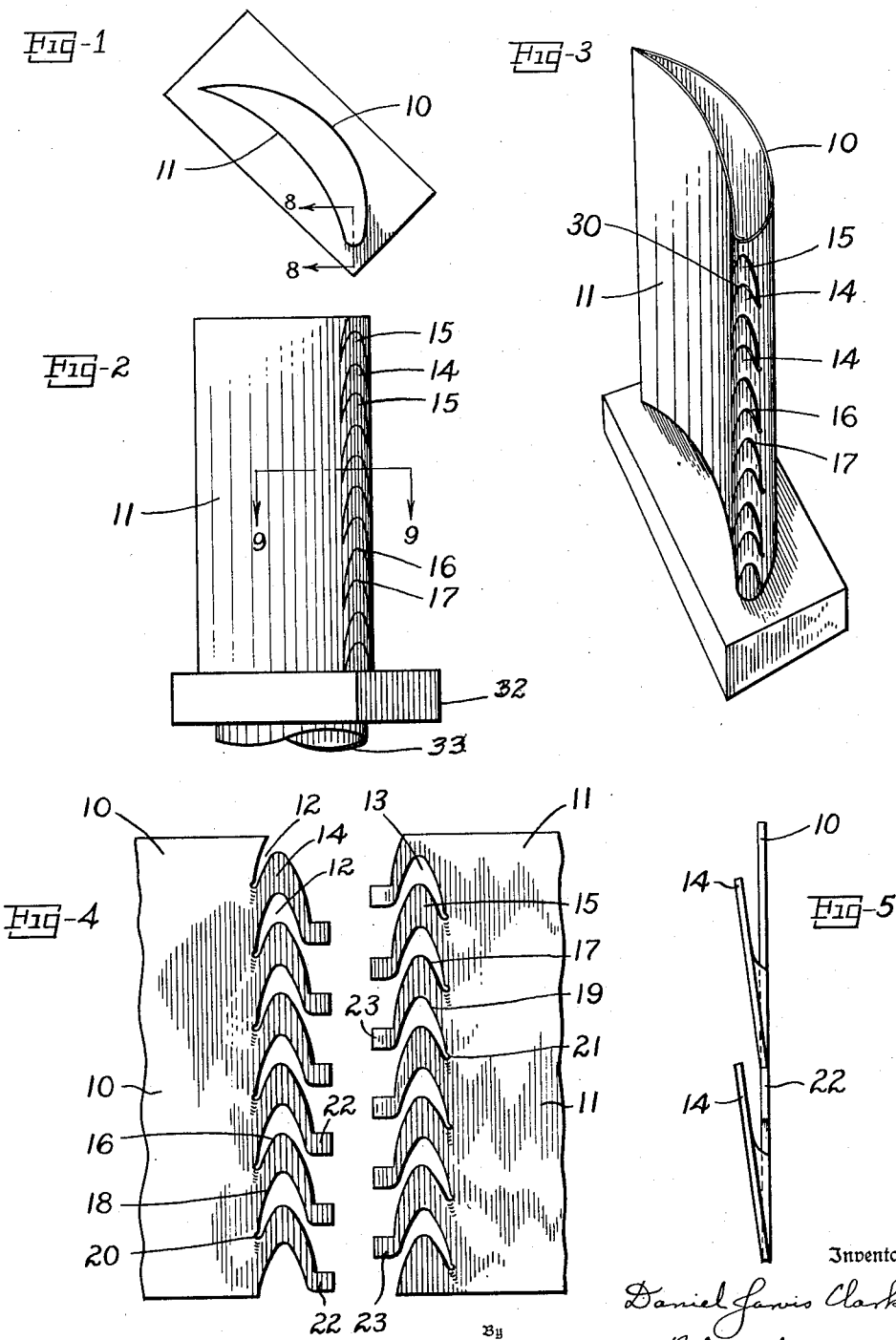
Inventor
Daniel Lewis Clarke
Marechal & Biebel
Attorneys Oct. 14, 1952 D. J. CLARKE 2,613,911
FLUID TURNING BLADE
Filed Nov. 6, 1947 2 SHEETS—SHEET 2
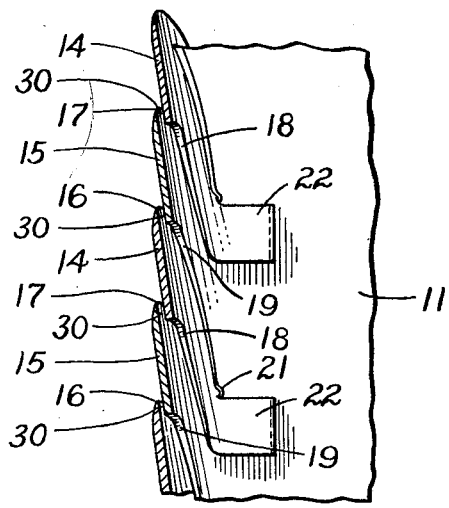
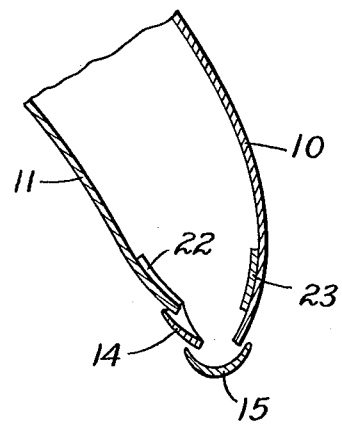
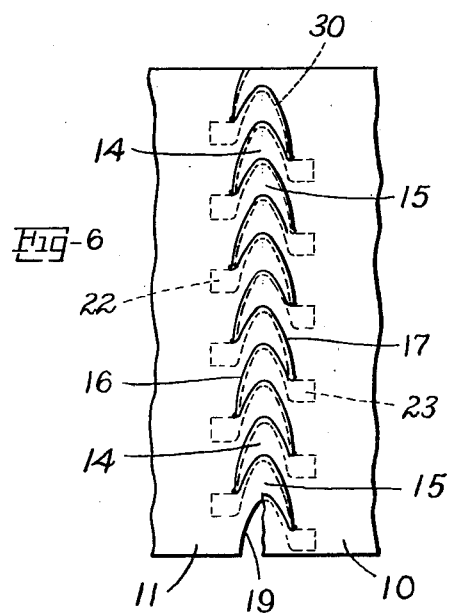
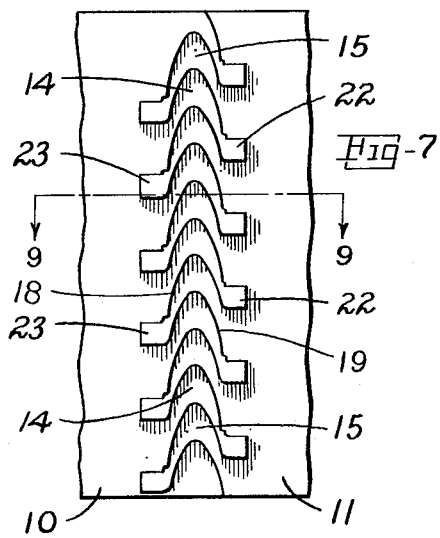
Inventor
Daniel Jarvis Clarke
By Marechal & Biebel
Attorneys Patented Oct. 14, 1952

2,613,911

UNITED STATES PATENT OFFICE 2,613,911

FLUID TURNING BLADE

Daniel Jarvis Clarke, Bay City, Mich., assignor to Stalker Development Company, Bay City, Mich., a corporation of Michigan Application November 6, 1947, Serial No. 784,457

17 Claims. (Cl. 253—77)

This invention relates to blades for turning or directing a flow of fluid and particularly to blades for turbines or the like adapted to operate in a flow of hot motive fluid.

The principal object of the invention is to provide a fluid turning or directing blade structure adapted for operation in a turbine or other device where there is a hot gas flow, the blade being provided with a series of slots extending across its nose or leading edge from which a protective layer of cooling air or gas may be discharged to protect the entire nose surface of the blade against damaging contact with the hot gas flow.

It is a further object to provide such a blade structure which is simple and inexpensive in construction, has adequate strength and reliabilty in operation, and which is provided with a pattern of slots across its entire nose or leading edge from which a protective flow of cooling fluid may be discharged.

It is also an object to provide a hollow blade formed by a pair of constituent parts stamped from flat sheet metal parts and fabricated into the shape of a hollow blade having the desired pattern of slots therein.

It is a further object to provide a hollow blade for a turbine or the like formed from a pair of stampings having complemental interfitting faces assembled in overlapping relation to provide a series of spaced open slots extending across the interfitted faces, the two stampings after being interfitted being formed into blade shape with the slots located across the nose or leading edge of the blade.

It is also an object to provide a method of forming a hollow slotted blade for use in a turbine or the like in which a pair of constituent parts are stamped from a flat sheet of material, the two parts then being interfitted with each other and formed into the proper blade contour.

It is also an object to provide a method of forming a hollow blade having a pattern of slots over its leading edge or nose and which is formed by stamping a pair of plates from flat sheet material having a series of notches along adjacent edges with the notches arranged in complemental relation, such plates being then interfitted or interlaced while flat to form a series of open slots extending across the interfitted edges and the plates thereafter being bent to form the contour of a hollow blade with the slots located on the nose or leading edge thereof.

Other objects and advantages will be apparent from the following description, the accompanying drawings, and the appended claims.

In the drawings—

Fig. 1 is a top plan view of the assembled blade of the present invention;

Figs. 2 and 3 are side elevational and perspective views thereof, respectively;

Fig. 4 is a view in plan of the two complemental sheets from which the blade is fabricated following the stamping thereof and prior to being interfitted;

Fig. 5 is a side elevational view of one of the stamped plates of Fig. 4;

Fig. 6 is a plan view from the outside surface of the blade with the two plates assembled but prior to being formed to blade shape;

Fig. 7 is a view similar to Fig. 6 from the opposite side of the plates;

Fig. 8 is a vertical sectional view on an enlarged scale through the nose of the blade looking toward the rear or thrust face and substantially on the line 8—8 of Fig. 1; and Fig. 9 is a horizontal sectional view on an enlarged scale through the nose of the blade on the line 9—9 which is shown in both Fig. 2 and Fig. 7.

The fabrication of hollow blades for directing or turning a flow of fluid, such as for turbines and the like, presents considerable difficulty because of the severe conditions under which blades of this character are required to operate. They are subjected both to high centrifugal and other operating stresses and are also in many cases bathed by a hot gas flow at temperatures which are so high that even stationary blades would be injuriously affected. To afford protection for such blades against this high temperature condition, a pattern of slots may be provided preferably extending across the nose of the blade in such relation that flows of cooling fluid may be discharged from the slots in such manner as to form a protective film thereover, such protective film preventing direct and impinging contact of the hot gas flow upon the blade surface in damaging relation thereto. Such slotted blade construction is disclosed in applicant's copending application Serial No. 510,884, filed November 19, 1943, now Patent No. 2,489,683, issued November 29, 1949.

In accordance with the present invention, a blade structure is provided which is relatively simple in construction, being formed by punching, stamping, or a like operation from flat sheet material. A pattern of notches defining a series of platelets therebetween is formed along adjacent edges of two such plates, the pattern being similar on the two plates but staggered or offset from each other. Thereafter the formed edges are interlaced or interfitted, the platelets of the two sheets overlapping each other and thus forming a series of slots therebetween. Preferably the platelets are bent at a relatively small angle away from the plane of the remainder of the plate so that when interfitted the slots formed between overlapped surfaces of the platelets will be open, and so shaped as to direct the discharge flow therefrom substantially tangentially across the nose surface of the blade, to thus afford protection for the entire exposed blade surface.

The platelets having been interlaced, are secured by welding projected portions or tabs thereon to the opposite plate, this being accomplished with the welded areas of both plates being located on the same side or surface of the plates, and in this way it is possible for all welded areas to be located on the inside of the formed blade where they will not be exposed, and thus not in position to impair or interrupt the smooth outer surface of the blade, nor to adversely affect its desired aerodynamic characteristics.

The two plates are formed into final hollow blade shape with one plate constituting the camber side and the other the thrust side of the blade. The forming is so carried out that the pattern of slots is located on the nose of the blade, the length of the slots being such that they extend across the nose and to some extent around to the opposite side faces of the blade, as far as desired to afford the necessary protection. Suitable shims or spacers may be inserted in the slots during this part of the operation to maintain uniform slot widths.

When connected to a suitable source of fluid, such as an air compressor, the slots each discharge a flow which is projected substantially spanwise across the nose and forward portions of the side faces, forming a series of overlapping cooling and protective films which cover and thus protect the entire nose and forward surface of the blade. The flows also travel rearwardly over the remainder of the blade surface on both sides thereof, and thus afford proper protection for the blade surface against the hot gas flow. Protection for the entire nose surface is highly important and desirable as assuring against damage to the blade notwithstanding movement or shift in the location of the stagnation point, i. e., the point where the flow divides, such shifting taking place with different operating conditions to which the blade is subjected. In this way the entire nose area which is the most exposed and difficult to protect, as well as the remainder of the blade surface, is adequately protected against damaging contact with the fluid in which the blade is working.

Referring to the drawings which disclose a preferred embodiment of the invention, the blade is formed from two sheets of material such as flat plates 10 and 11, the plate 10 being that adapted to form the camber side of the blade while the plate 11 is that forming the thrust side. These plates may be of suitable high-temperature and corrosion resistant alloy steel or other material having the necessary physical characteristics which will retain its strength at high temperatures while permitting the deformation required in the forming operations. A suitable sheet for example will be a sheet of 25 gage stainless steel of high heat and corrosion resistant alloy, such as that sold by American Rolling Mill Company as GT-45 which has a high content of nickel and chromium.

A pattern of notches is provided in the adequate edges of each of sheets 10 and 11, such notching being performed by convenient metal forming operations such as punching, stamping, or the like. Where the sheets are to be heat treated the stamping may be performed prior to the heat treatment, and the hardness and other characteristics desired may be developed following the completion of the stamping operations.

The notches in plate 10 are shown at 12 as of generally crescent shape, defining a series of platelets 14 therebetween. As shown, the notches are so formed that the platelets are defined by an upper curve 16 and lower curve 18, these curves defining the outer or discharge end of the slot, and the inner or inlet end thereof, respectively. The inner corner of each platelet where it joins the main body of the plate is preferably notched out as shown at 20 to provide an additional recess for receiving the opposite platelet in the assembled form. Each platelet terminates in a tab 22, the tabs having such shape as to facilitate their being secured to the opposite plate surface.

Plate 11 has a similar pattern of notches in its edge defining the series of platelets 15 bounded by the upper curve 17, lower curve 19, and having enlarged recesses 21 and tabs 23. The pattern however is staggered or offset from that of plate 10 by a half length as shown in Fig. 4.

In order to provide for forming open slots with a slotted passage of predetermined width, the platelets of both series are preferably bent at a relatively small angle to the plane of the remainder of the plate, as shown in Fig. 5, the tabs however preferably remaining in the plane of the sheet to facilitate their joining with the opposite plate surface. This bending of the platelets may conveniently be accomplished at the same time and as part of the stamping or forming operation.

The two plates so formed are then interfitted or interlaced with each other into the arrangement shown in Figs. 6 and 7. It is found that this can readily be accomplished by holding the two plates slightly inclined relatively to each other, and by engaging the two series of platelets with each other with a slight twisting motion the edges of the two plates can be readily brought together and the assembly made quickly and without difficulty.

As shown in Fig. 6, the appearance of the assembled plates from the side which is to constitute the outside of the blade resembles a series of spade shaped members overlapping each other and being alternatively integral with the opposite plates, the platelets being bent slightly above the plane of the plates so as to define slots between each adjacent pair. It will further be noted that the length of each platelet is such in relation to the spacing of the platelets in the opposite series that there is a definite overlapping, indicated by the dotted lines in Fig. 6, thus defining the slotted passages 30 which have the curved and forwardly extending shape as indicated.

On the rear side of the plates, i. e., the side which is to constitute the interior of the hollow blade, the appearance is as shown in Fig. 7. The tabs 22 are all in contact with a portion of the plate 11 spaced inwardly beyond the notches 13, and similarly the tabs 23 are all in contact with the surface of plate 10 inwardly beyond the notches 12. This provides for ready securing of the tabs to the respective plate surfaces which is conveniently done by brazing, welding, or other suitable metal working step. It will be noted that this operation is performed without changing the angular relationship of the platelets to the plane of the sheet material and thus the slots 30 remain as open slots in the assembled condition of the two plates.

Thereafter the assembled plates are bent into the form or contour of a blade, such as the shape indicated in Figs. 1, 3 and 9 with plate 10 forming the camber side and plate 11 the thrust side of the blade. This is conveniently done by bending the plates about a form, the bending being so carried out that the joined edges and the slots 30 will be located upon the nose portion of the blade as indicated in Figs. 8 and 9. Preferably these slots 30 are located substantially centrally of the nose and the series extends spanwise across the entire extent of the nose. By a suitable selection of the shape of the notches and platelets, the slots can likewise be caused to extend to a greater or less extent around each side face of the blade, to thus discharge slot flows not only across the entire nose area but to some extent on the side faces as well.

As shown in Fig. 8 the slots 30 have a predetermined width (distance between the overlapped portions of the platelets) as determined by the amount of bending of the platelets, and the slots likewise have a definite axial length determined by the amount of overlapping between adjacent platelets. This length is desirable as providing a definite direction of discharge flow which is substantially tangentially across the face of the platelets, with the flow from each slot being substantially parallel to and in overlapping relation with the flow from the other slots. In this way a highly effective and substantially complete protective film is provided over the entire exposed nose area, and such flow is carried around the sides of the blade to the extent desired imparting additional protection thereto.

In order to assure the maintenance of uniform thickness of the slots 30 during the forming or bending operation in which the two interfitted plates are shaped to the desired blade contour, suitable shims or spacers may be inserted in each of the slots 30 before this bending takes place, the shims serving to keep the slots open and of uniform width, and being withdrawn after the bending and the shaping of the blade is completed. It is also possible in this way to control accurately the width of the slots by the selection of shims of suitable gage or thickness. If desired the shims may be of tapering thickness so as to vary the shape of each individual slot from one side or end thereof to the other, or if desired, the slots may be formed to be of uniform width through their extent from one side of the blade to the other and from the inlet to the discharge end thereof. This control through the use of shims is advantageous as assuring the formation of slots of uniform dimensions in the final blade notwithstanding minor variations in the initial steps of punching and bending.

Each blade is suitably mounted on a base 32 and a tube 33 extends through the base and establishes a flow passage for the cooling fluid which is supplied from a suitable source such as a compressor and delivered to the interior of the hollow blade for discharge from the slots.

The invention thus provides a blade for a turbine or the like which is highly effective for the purpose desired, making it possible to operate such blade under conditions which would otherwise be damaging to the material of the blade. The blade as constructed is simple, can be fabricated by relatively inexpensive metal forming processes, and the arrangement and pattern of the slots can be easily changed and predetermined as desired for different types of blades. The blade in its finished form is of strong and sturdy construction, the fabricating steps described providing adequate strength for the blade at the slotted area, and thus there is no tendency toward blade failure because of the slotting arrangement provided. With this blade in operation, the entire nose surface is protected by a fluid flow supplied from the interior of the blade, and such protection remains effective notwithstanding considerable shift in the stagnation point due to different operating conditions.

While the method and form of apparatus herein described constitutes preferred embodiments of the invention it is to be understood that the invention is not limited to this precise method and form of apparatus, and that changes may be made therein without departing from the scope of the invention which is defined in the appended claims.

What is claimed is:

1. A hollow blade for use in a turbine or the like comprising a pair of plates with notched interfitted edges having portions depressed at an angle to the plane thereof defining a pattern of slots each extending at an acute angle to the face of said plates, the sheets being bent into blade shape with the slots being located upon and extending across the nose of the blade and opening in a direction generally spanwise thereof.

2. A hollow blade for use in conjunction with a hot gas flow comprising a pair of sheet metal members with notched interfitting edges overlapping with each other and having portions thereof depressed at an angle to the plane of said members defining a series of slots with their openings spaced across the nose of the blade and with the length of said slots extending in a direction generally spanwise thereof.

3. A hollow blade for use in conjunction with a hot gas flow comprising a pair of sheet metal members having notched edges forming a series of platelets having portions depressed at an angle to the plane thereof, the platelets of each of said members being interfitted and overlapped with the notches of the other said member forming a series of slots with their openings spaced across the nose of the blade and with their length extending in a direction generally spanwise of the blade.

4. A hollow blade for use in a turbine or the like comprising a pair of sheet metal members having notched edges forming a series of platelets, the platelets of each said member being bent away from the plane of the sheet and being interfitted with the notches of the other member providing a series of overlapped slots the openings of which are spaced across the nose of the blade with said slots extending at a small angle to the nose of said blade and in a direction generally spanwise thereof.

5. A hollow blade comprising a pair of sheet metal plates stamped with a series of elongated complemental notches therein defining a series of staggered platelets on adjacent edges with portions thereof deflected at an angle to the plane thereof, said plates having their adjacent edges interfitted and secured together leaving a series of slots therebetween defined by the walls of said platelets, said platelets in said interfitted relation overlapping each other defining a series of slots with their axes at an angle to the face of said plates adapted to discharge a flow substantially tangentially across the blade surface, said plates being bent into blade shape with said slots located on and extending across the nose of said blade.

6. A hollow blade comprising two plates each having a plurality of notches therein defining a series of platelets therebetween with portions thereof at an angle to the plane of said plates, said plates being secured in interfitting relation with each other with the platelets of each plate occupying a notch of the other plate, the platelets of one said plate overlapping the platelets of the other said plate forming a series of slots having their axes at an angle to the face of said plates and opening in a direction generally spanwise of the blade, and said plates being curved to define the opposite surfaces of a hollow blade.

7. A hollow blade comprising two plates each having a plurality of notches therein defining a series of platelets therebetween, said plates being secured in interfitting relation with each other with the platelets of each plate occupying a notch of the other plate, the platelets of one said plate overlapping the platelets of the other said plate forming a series of slots therebetween, said platelets being bent at a small angle to the plane of said plates to provide for opening the slots between adjacent platelets, and said plates being curved to define the surfaces of a hollow blade.

8. A hollow blade of the character described comprising two plates each having a plurality of notches therein defining a series of platelets therebetween, said plates being secured in interfitting relation to each other with the platelets of each plate occupying a notch of the other said plate and being spaced apart to form a series of discharge slots between them to direct flows of fluid substantially tangentially along the outer surface of the blade.

9. A hollow blade of the character described comprising a pair of plates each having a plurality of notches in the edge thereof defining a series of platelets therebetween, said plates being welded together with the platelets of one said plate overlapping the platelets of the other said plate and received within the notches of the other said plate, the edges of both said plates lying within the interior of said blade.

10. A hollow blade of the character described comprising a pair of plates each having a plurality of notches in the edge thereof defining a series of platelets therebetween, said notches having enlargements at the corners of said platelets, said plates being welded together with the platelets of one said plate overlapping the platelets of the other said plate and being received within the notches of the other said plate and extending into said enlargement, the edges of both said plates lying within the interior of said blade and being secured respectively to the opposite said plate to retain the plates in assembled relation.

11. The method of fabricating a hollow blade adapted for use in conjunction with a hot gas flow which comprises stamping a pair of sheet metal plates having complemental platelets and notches therein on adjacent faces, interfitting said stamped plates with each other to form a series of open slots and securing said notched edges of one plate to the complemental portions of the other said plate, and bending the plates to constitute opposite faces of a hollow blade with said series of slots being located on and extending across the nose of the blade and opening in a direction generally spanwise of said blade.

12. The method of fabricating a hollow blade for use in a turbine or the like which comprises stamping a pair of flat sheet metal plates having complemental platelets and notches therein on adjacent faces, interfitting said stamped platelets with each other to form a series of slots with overlapping edges securing said interfitted platelets to each other, and bending the plates to constitute opposite faces of a hollow blade with said series of slots being located on and extending across the nose of the blade and opening in a direction generally spanwise thereof.

13. The method of fabricating a hollow blade for use in a turbine or the like which comprises stamping a pair of flat sheet metal plates having complemental platelets and notches therein on adjacent faces, bending said formed platelets away from the plane of said plates, interfitting said stamped platelets with each other to form a series of slots with overlapping edges and securing said platelets in said interfitted relation, said bending of said platelets forming slot openings directed substantially tangentially across the surface, and bending the plates to constitute opposite faces of a hollow blade with said series of slots being located on and extending across the nose of the blade and opening in a direction generally spanwise of the blade.

14. The method of fabricating a fluid-turning blade comprising the steps of stamping notches along the free edge portions of two plates to form thereon a plurality of spaced platelets, interlacing said platelets in overlapping relation forming a series of slots with overlapping edges, welding the edges of said platelets to the adjacent surface of the other said plate leaving said slots open, and forming the plates into a form of a hollow blade.

15. The method of fabricating a fluid-turning blade comprising the steps of stamping notches along the free edge portions of two plates to form thereon a plurality of spaced platelets, interlacing said platelets of both plates in overlapping relation forming a series of open slots therebetween, securing said interlaced plates permanently together with said slots remaining open, and bending said plates into the form of a hollow blade.

16. The method of fabricating a fluid-turning blade comprising the steps of stamping notches along the free edge portions of two plates to form thereon a plurality of spaced platelets, interlacing said platelets of both plates in overlapping relation forming a series of open slots therebetween, securing said interlaced plates permanently together with said slots remaining open, and bending said plates into the form of a hollow blade with said slots located on and extending across the nose of the blade.

17. The method of fabricating a hollow blade comprising the steps of stamping notches along the free edge portions of two plates to form thereon a plurality of spaced platelets, bending said platelets at an angle to the plane of said plates, interlacing said platelets in overlapping relation with said bent platelets defining a series of open slots between each other adapted to direct a flow of fluid therefrom substantially tangentially along the blade surface, securing said interlaced plates permanently together with said slots remaining open, and thereafter bending said plates into the form of a hollow blade with said slots being located on and extending across the nose of the blade.

DANIEL JARVIS CLARKE.

REFERENCES CITED

The following references are of record in the file of this patent:

UNITED STATES PATENTS

| Number | Name | Date |
|---|---|---|
| 70,383 | Wilmot | Oct. 29, 1867 |
| 1,016,584 | Shepherd | Feb. 6, 1912 |
| 2,220,420 | Meyer | Nov. 5, 1940 |
| 2,489,683 | Clarke | Nov. 29, 1949 |